(12) United States Patent
Pei et al.

(10) Patent No.: US 11,423,200 B2
(45) Date of Patent: Aug. 23, 2022

(54) PUMP MACHINE UNIT OPTIMIZED OPERATION REGULATION SYSTEM AND METHOD BASED ON DIGITAL TWIN

(71) Applicant: Jiangsu University, Zhenjiang (CN)

(72) Inventors: Ji Pei, Zhenjiang (CN); Xiaobo Gong, Zhenjiang (CN); Wenjie Wang, Zhenjiang (CN); Jianping Yuan, Zhenjiang (CN); Shouqi Yuan, Zhenjiang (CN); Jinfeng Zhang, Zhenjiang (CN); Yanjun Li, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/530,995

(22) Filed: Nov. 19, 2021

(65) Prior Publication Data

US 2022/0164502 A1 May 26, 2022

(30) Foreign Application Priority Data

Nov. 23, 2020 (CN) .......................... 202011321590.X

(51) Int. Cl.
*G06F 30/27* (2020.01)
*G06N 5/02* (2006.01)
(Continued)

(52) U.S. Cl.
CPC .............. *G06F 30/27* (2020.01); *G06N 5/02* (2013.01); *G06F 2111/10* (2020.01); *G06F 2119/02* (2020.01)

(58) Field of Classification Search
CPC .. G06F 30/27; G06F 2111/10; G06F 2119/02; G06F 30/17; G06F 30/367;
(Continued)

(56) References Cited

U.S. PATENT DOCUMENTS

2014/0288776 A1\* 9/2014 Anderson ................ H02K 7/06
701/37

FOREIGN PATENT DOCUMENTS

CN 101048710 A \* 10/2007 ............. B01D 53/30
CN 105868487 A \* 8/2016 ........... G06F 30/367
(Continued)

OTHER PUBLICATIONS

Anderson et al., U.S. Patent Application Publication 2014/028877, see the short version.\*
(Continued)

*Primary Examiner* — Kandasamy Thangavelu
(74) *Attorney, Agent, or Firm* — WPAT, PC

(57) ABSTRACT

A pump machine unit optimized operation regulation system is provided, and includes a physical body, a digital twin, a digital twin body of the physical body and a digital space. The digital space drives the digital twin to realize data mirroring, mapping reconstruction, information interactive feedback and simulation of a pump machine unit optimized regulation system in virtual space and a pump machine unit optimized regulation system in physical space. The disclosure constructs the virtual twin body of the physical body of the pump system based on the digital twin to realize the data mirror and information interaction between the physical body and the virtual twin body, and physical object twin, operation process twin and control performance twin of the physical entity and digital twin body. Running state monitoring, optimized regulation, simulation and health prediction of the pump machine unit can be realized.

8 Claims, 6 Drawing Sheets

(51) Int. Cl.
  *G06F 119/02* (2020.01)
  *G06F 111/10* (2020.01)
(58) Field of Classification Search
  CPC ........ G06N 5/02; B01D 53/80; B60G 17/015;
         B63B 9/00; F24F 11/46; F24F 11/62;
         G05B 19/41885; H02K 7/06
  See application file for complete search history.

(56) References Cited

FOREIGN PATENT DOCUMENTS

| | | | | |
|---|---|---|---|---|
| CN | 106570263 A | * | 4/2017 | ............. G06F 30/17 |
| CN | 108931030 A | * | 12/2018 | ............. F24F 11/62 |
| CN | 109373525 A | * | 2/2019 | ............. F24F 11/46 |
| CN | 110282074 A | * | 9/2019 | ............. B63B 9/00 |
| EP | 3626485 A1 | * | 3/2020 | ........... B60G 17/015 |
| EP | 3696622 A1 | * | 8/2020 | ....... G05B 19/41885 |

OTHER PUBLICATIONS

Li et al., "Numerical prediction and performance experiment in an engine cooling water pump with different blade outlet widths", Mathematical problems in engineering, May 2017.*

Elshich, A.A ,(The cavitation effects in centrifugal pumps, Sudan University of science and technology, Jul. 2018.*

Zhassandykzy et al., water recycling automation of car wash with cleaning channel and changeable adsorptive plate holders, Kazakh National Research technical university, May 2017.*

Monica Kohn, "What is Knowledge Base in Artificial Intelligence?", Jul. 21, 2020.*

Tejas Rao, "Where can CSPs use digital twins? Everywhere", Accenture Jun. 2020.*

Rafael Lastra, Saudi Aramco, "Electrical Submersible Pump Digital Twin, the Missing Link for Successful Condition Monitoring and Failure Prediction", Society of Petroleum Engineers, 2019, pp. 1-10.

Andres L. Carrillo Pena et al., "Improving the Performance of Centrifugal Pumps in Serial and Parallel Configurations Using Digital Twins", Proceedings of the ASME 2019, International Mechanical Engineering Congress and Exposition IMECE 2019, Nov. 11-14, 2019, pp. 1-8.

Rafael Lastra, Saudi Aramco, "Electrical Submersible Pump Digital Twin, the Missing Link for Successful Condition Monitoring and Failure Prediction ", Society of Petroleum Engineers, pp. 1-10.

Andres L. Carrillo Pena et al. "Improving the Performance of Centrifugal Pumps in Serial and Parallel Configurations Using Digital Twins", Proceedings of the ASME 2019, pp. 1-8.

* cited by examiner

PUMP MACHINE UNIT OPTIMIZED OPERATION REGULATION SYSTEM AND METHOD BASED ON DIGITAL TWIN

TECHNICAL FIELD

The disclosure relates to the technical field of pump machine unit optimized regulation, in particular to a pump machine unit optimized operation regulation system and method based on digital twin.

BACKGROUND

China's industrial energy consumption accounts for about 70% of the country's total energy consumption, and the power consumption of pump products accounts for more than 20% of the national power generation. Under the background of huge energy consumption, it also represents a huge space for energy conservation optimization. At present, compared with foreign countries, the average efficiency of China's pump is 2%-5% lower than that of foreign countries, and the operating efficiency of the pump system is about 20% lower. The research on the optimization of water pump structure has been basically mature, but the existing water supply system in the selection, system design and operation control are insufficient, so the research focus of energy saving and consumption reduction is placed on the optimization of water pump control mode. In the actual operation of pump, the waste of energy consumption is serious due to the unreasonable design of pump and valve system. The energy consumption waste of the pump system mainly lies in the low efficiency and short life of the pump in the operation process, and the fundamental reason lies in the optimal working condition of the centrifugal pump design and the process and pipeline system requirements do not match, and the lack of intelligent working condition regulation means.

Digital twin is a concept beyond reality that can be seen as a digital mapping system of one or more important, interdependent equipment systems, but real events in the real world are uncertain and do not occur exactly in the desired order. Therefore, when digital twin system to capture a set of real events, how to simulate the real events in a different order is one of the key issues facing the implementation of the digital twin simulation system. So, the disclosure provides a pump machine unit optimized operation regulation system and method based on digital twin in order to solve the problems existing in the prior art.

SUMMARY OF THE DISCLOSURE

According to the above problems, the aim of the disclosure is to provide a pump machine unit optimized operation regulation system and method based on digital twin, describing the evolution process and the realization method of digital twin by building a 3D physical model, a logical model, a process model, a control model, a simulation model and a data model according to the machine learning algorithms. When user demand conditions change, the system provides new schemes to regulation of new working conditions through optimization algorithm and machine learning, evaluates multiple schemes and performs simulation calculation to multiple evaluated schemes entered into the digital twin, and makes decisions on the simulation results and then delivers them to the pump machine unit control center. The pump machine unit control center adjusts the relevant variables according to the optimized scheme to meet the demand condition under a certain reliability, and make the system be most energy efficient, so that achieving optimized regulation. Meanwhile, it solves the existing pump machine unit in the process of operation of low efficiency, low reliability problem, solve the pump machine unit in the process of operation monitoring, can be health diagnosis of equipment, and improve the health status of pump in the process of operation.

To achieve the purpose of the disclosure, an embodiment of the disclosure is realized through the following technical scheme: a pump machine unit optimized operation regulation system and method based on digital twin, including a physical body, a virtual twin body, a digital twin and a digital space. The physical body includes a pump machine unit, a pump machine unit data collection center and a pump machine unit control center. The digital space is structured by mutual coupling and evolution of an information portal module, a data repository module, a knowledge-base module, an optimization algorithm module, a machine learning module, an evaluation module and a decision module, and thereby to drive the digital twin to realize data mirroring, information interactive feedback, optimization adjustment, equipment health diagnosis and analogue simulation of a pump machine unit optimized regulation system in virtual space and another pump machine unit optimized regulation system in physical space. The digital twin includes a physical object twin, an operation process twin and a control performance twin.

In a further embodiment, the pump machine unit, the pump machine unit data collection center and the pump machine unit control center as a whole to constitute a corresponding physical entity of the pump machine unit optimized operation regulation system based on digital twin. The pump machine unit includes water pumps, a flow meter, an electric valve, a check valve, a bypass pipeline, a pressure gauge and a connecting pipeline. The pump machine unit data collection center is configured to perform a collection of flow in each the pipeline, a collection of start-stop state of each the pump, a collection of water pressure in each the pipeline, a collection of opening degree of the electric valve, a collection of speed of each the pump, a collection of power of each the pump and a collection of other required data. And the pump machine unit control center is configured to perform a control of speed of each the speed, a control of opening degree of the electric valve and a control of start-stop of each the pump.

In a further embodiment, the information gateway module is configured to provide a human-computer interaction platform. The data repository module is configured to store an operating data monitored by the pump machine unit and data and scheme information required in the digital space. The knowledge-base module is configured to provide a knowledge model. The optimization algorithm module is configured to optimize demand conditions and provide a regulation scheme. The machine learning module is configured to learn historical decision schemes, train and optimize a simulation model, learn and correct a model of optimization algorithm, and learn monitored data. The evaluation module is configured to perform scheme selection and evaluate simulation results. The decision module is configured to make decisions on evaluated schemes.

In a further embodiment, a pump machine unit optimized operation regulation method based on digital twin realize the digital twin and the analogue simulation according to a digital twin model. A data model of the digital twin includes a perception monitoring layer, a network transmission layer, a data blending layer and an interactive control layer. The perception monitoring layer is configured to provide a monitoring information flow for the physical object twinning of the digital twin. The network transmission layer is configured to provide a control information flow for the operation process twinning of the digital twin. The data blending layer is configured to provide a data information flow for the control performance twinning of the digital twin. The interactive control layer is configured to provide a decision control flow for the digital twin.

The pump machine unit optimized operation regulation method based on digital twin, an optimized operation mechanism of the pump machine unit optimized regulation system in virtual space realized by the digital twin includes the following steps:

step 1: demand conditions input, including: inputting the demand conditions into the system through the information gateway module by a user;

step 2: optimization schemes calculation, including: transmitting the demand conditions to the optimization algorithm module and the machine learning module for performing scheme calculation and obtaining multiple optimization schemes;

step 3: scheme evaluation, including: performing scheme evaluation to the optimization schemes entered into the evaluation module, and selecting several better schemes;

step 4: simulation calculation, including: performing simulation calculation to the several better schemes entered into a digital twin body and outputting simulation results;

step 5: performance evaluation, including: performing performance evaluation to the simulation results by the evaluation module;

step 6: scheme decision, including: doing a decision to an optimal scheme entered into the decision module after the performance evaluation to judge whether meets requirements, outputting the optimal scheme to the pump machine unit control center when meets the requirements, or adjusting parameters when does not meet the requirements and re-calculating a new scheme until meets the requirements of the decision module;

step 7: pump machine unit control, including: adjusting relevant variables according to a final scheme by the pump machine unit control center to meet the demand conditions under a certain reliability and thereby make the system be most energy efficient, thus achieving optimized regulation.

In a further embodiment, a pump machine unit optimized regulation is achieved according to a computing scheme based on machine learning and optimization algorithm, provides the optimization schemes to regulation of the demand conditions through the optimization algorithm and the machine learning, evaluates the optimization schemes and perform simulation calculation to the optimization schemes after the evaluation entered into the digital twin body, makes decision to the simulation results and then deliveries the final scheme to the pump machine unit control center; and the pump machine unit control center adjusts the relevant variables according to the final scheme to meet the demand conditions under the certain reliability and thereby make the system be most energy efficient, thus achieving the optimized regulation.

A pump machine unit optimized operation regulation method based on digital twin, an establishment of the data model of the digital twin includes an establishment of the physical object twin, an establishment of the operation process twin, an establishment of the control performance twin and an establishment of a simulation model, specifically includes the following steps:

step 1: establishment of 3D physical model, including: establishing a 3D physical model the same as a physical entity of the physical space, which specifically comprises making the pump machine unit and its pipe fitting accessories form a structure same as the physical entity, defining geometric properties, movement properties, functional properties, material properties, a geometric shape and a mechanical structure of the physical entity, and thereby realizing the physical object twin;

step 2: establishment of logical model, including: mapping the 3D physical model to a logical model, describing components, organizational structure and operation mechanism of the logical model graphically and formally, feedbacking properties and behaviors of the components to the physical model through the logical model, and thereby realizing an optimization of the physical model;

step 3: establishment of process model, including: mapping an actual running process of a fluid to the digital space according to step 1 and step 2, and establishing a numerical simulation process same with the actual running process, and thereby realizing the operation process twin;

step 4: establishment of control model, including: establishing a mapping of a control process same with the physical entity to make the digital twin body be capable of imitating a same control process and thereby realize adjustment of related parameters, and thereby realizing the control performance twin;

step 5: establishment of simulation model, including: building a simulation model with the same structure, function and process as the physical entity to realize visualizations of a twin object, a twin structure, a twin process and a twin control of the physical entity based on step 1, step 2, step 3 and step 4;

step 6: simulation model optimization, including: training and optimizing the simulation model by machine learning based on multi-source data of database according to the simulation model in step 5, and feedbacking simulation results to each model and optimizing each model;

step 7: verification of simulation model, including: verifying consistency and reliability of the physical model and the simulation model, and executing step 6 if the optimization conditions of the simulation model are met, otherwise, returning to execute step 2;

step 8: construction of data model, including: building a computable data model, using methods of machine learning, iterative optimization and intelligent decision to realize data mirroring and data exchanging of the physical body and the virtual twin body based on multi-source data of database;

step 9: realization of digital twin, including: integrating the 3D physical model, the logical model, the process model, the control model, the simulation model and the data model, and realizing the digital twin of the pump machine unit optimized regulation system in physical space in the virtual space through data-driven and real-time interaction.

In a further embodiment, the digital twin has functions of perception analysis, analogue simulation, iterative optimization and decision control. The digital twin achieves intelligent sensing, real-time monitoring, optimized regulation and health prediction of the physical entity of the pump machine unit through the digital twin body.

In a further embodiment, 3D physical modeling tools for realizing the digital twin body include a laser scanner, a Unigraphics Next Generation (UG NX), a Creo Parametric and a three-dimensional Studio Max (3DsMax), and computational fluid dynamics (CFD) series software is used in virtual simulation calculation.

The disclosure has the following beneficial effects: describing the evolution process and the realization method of digital twin by building the 3D physical model, the logical model, the process model, the control model, the simulation model and the data model according to the machine learning algorithms; when a user demand conditions change, the system provides new schemes to regulation of the new working conditions through optimization algorithm and machine learning, evaluates multiple schemes and performs simulation calculation to multiple evaluated schemes entered into the digital twin, makes decisions on the simulation results and then delivers them to the pump machine unit control center. The pump machine unit control center adjusts the relevant variables according to the optimized scheme to meet the demand condition under a certain reliability, and thereby make the system be most energy efficient, thus achieving optimal regulation. Meanwhile, it solves the existing pump station or pump machine unit in the process of operation of low efficiency and low reliability problem, solves the pump machine unit in the process of operation monitoring and health diagnosis of equipment, so as to improve the health status of pump in the process of operation.

DETAILED DESCRIPTION OF EMBODIMENTS

Figure 1:
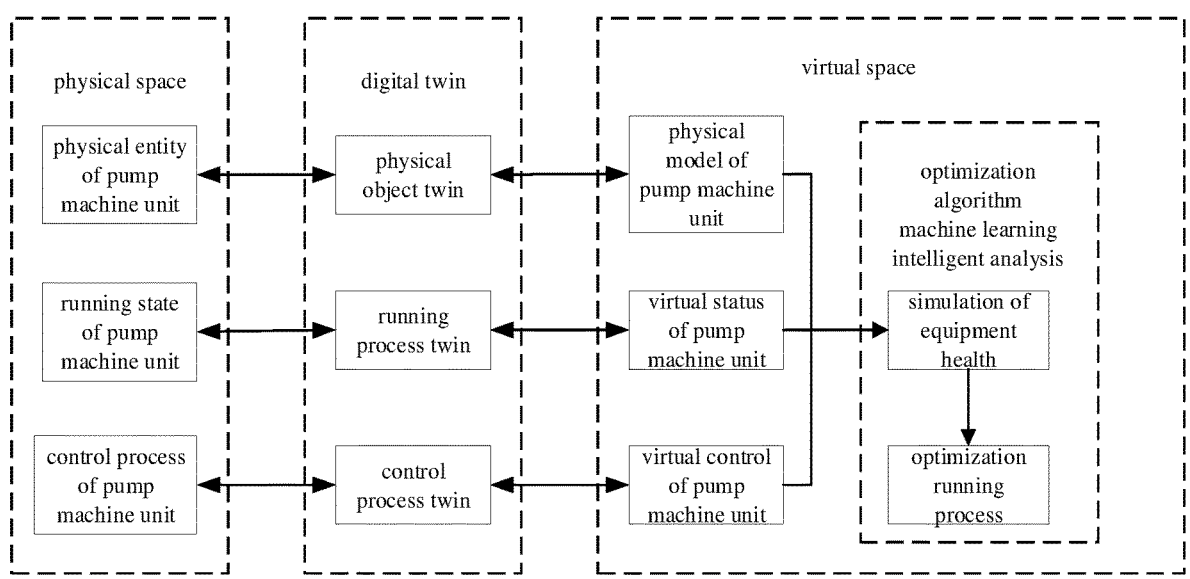
FIG. 1 is a general framework schematic view of a pump machine unit optimized operation regulation system based on digital twin of the disclosure.

In order to deepen the understanding of the disclosure, the disclosure will be further detailed in combination with the embodiment below, which is only used to explain the disclosure and does not constitute the limit of the scope of protection of the disclosure.

According to FIG. 1, FIG. 2, FIG. 3, FIG. 4, FIG. 5, FIG. 6, this embodiment provides a pump machine unit optimized operation regulation system and method based on digital twin, including a physical body, a virtual twin body, a digital twin and a digital space. The physical body included a pump machine unit, a pump machine unit data collection center and a pump machine unit control center. The digital space is composed of an information portal module, a data repository module, a knowledge-base module, an optimization algorithm module, a machine learning module, an evaluation module and a decision module coupling evolution architecture. The digital space is structured by mutual coupling and evolution of the information portal module, the data repository module, the knowledge-base module, the optimization algorithm module, the machine learning module, the evaluation module and the decision module. Thus, the digital twin is driven to realize data mirroring, information interactive feedback, optimization adjustment, equipment health diagnosis and analogue simulation of a pump machine unit optimized regulation system in virtual space and a pump machine unit optimized regulation system in physical space. The digital twin includes a physical object twin, an operation process twin and a control performance twin. In some embodiments, the pump machine unit data collection center is embodied by at least one processor and at least one memory coupled to the at least one processor, and the at least one memory stores programs executable by the at least one processor. Likewise, the pump machine unit control center is embodied by at least one processor and at least one memory coupled to the at least one processor, and the at least one memory stores programs executable by the at least one processor. In an exemplary embodiment, the information portal module, the data repository module, the knowledge-base module, the optimization algorithm module, the machine learning module, the evaluation module and the decision module may be software modules stored in one or more memories and executable by one or more processor coupled to the one or more memories.

The pump machine unit, the pump machine unit data collection center and the pump machine unit control center as a whole to constitute a corresponding physical entity of the pump machine unit optimized operation regulation system based on digital twin. The pump machine unit includes water pumps, a flow meter, an electric valve, a check valve, a bypass pipeline, a pressure gauge and a connection pipe. The water pumps are used to pressurize water to meet working conditions of amuser; the flow meter is used to monitor the flow of water; the electric valve is used to adjust the valve opening and adjust the flow of water; the check valve is used to prevent backflow of water; the bypass pipeline is used to transfer excess water back to the pipeline and adjust the water flow; the pressure gauge is used to monitor the inlet and outlet pressure of water; the connecting pipeline is used to connect various components into a working whole.

The pump machine unit data collection center is configured to perform a collection of flow in each pipeline, a collection of start-stop state of each pump, a collection of water pressure in each pipeline, a collection of opening degree of electric valve, a collection of speed of each pump, a collection of power of each pump and a collection of other required data, and the pump machine unit data collection center collects and storages the collection of the above part of the data.

The pump machine unit control center is configured to perform a control of speed of each pump, a control of opening degree of electric valve and a control of start-stop of each pump, when a user changes demands, through calculation of the digital space to give optimization schemes, it based on optimization scheme to adjust pump speed, opening of electric valve, start-up state of pump, the pump machine unit system to meet demand conditions and within the scope of a certain reliability run time of minimum energy consumption. Secondly, in the operation process of the pump machine unit, if there is a partial operating condition or deviation from the pump machine unit reliability range of operation, it can be controlled through human-computer interaction interface or according to the optimization scheme.

The information gateway module is configured to provide a human-computer interaction platform, not only can access all database and module, and can achieve the virtual scene consistent with the geometric structure of the physical body in the visual effect, can realize the virtual scene consistent with physical model motion process, can realize the virtual scene consistent with controlled process with physical model, and can realize the image of the physical space and the virtual space.

The data repository module is used to store the operating data monitored by the pump machine unit and all the necessary data and scheme information (also referred as data and scheme information required) in the digital space.

The knowledge-base module is used to provide a knowledge model and fuses the data into data with certain characteristics and regularity.

The optimization algorithm module is used to optimize demand conditions and provide a regulation scheme.

The machine learning module is used to learn historical decision schemes so as to predict the optimal scheme, train and optimize the simulation model, feedback the simulation results to each model, and optimize each model, learn and correct the model in the optimization algorithm, learn monitoring data and diagnose equipment health according to the characteristics of data.

The evaluation module is used to screen the schemes and evaluate the simulation results.

The decision module is used to make decisions on the evaluated scheme and judge whether it meets the requirements. If the requirements are met, the optimal scheme is output to the pump machine unit control center. If the requirements are not met, the parameters are adjusted and the new scheme is calculated again until the requirements of the decision-making machine are met.

A pump machine unit optimized operation regulation method based on digital twin realize the digital twin and the analogue simulation according to a digital twin model. The data model of the digital twin includes a perception monitoring layer, a network transmission layer, a data blending layer and an interactive control layer.

The perception monitoring layer is used to monitor the pump machine unit in the operation process of equipment working state, working condition state parameters, and equipment operation parameters. The perception monitoring layer is also used to perform perception to the physical object of the 3D model, and provide the monitoring information flow to the physical object twin of the digital twin.

The network transmission layer is used for the unified networking, protocol conversion and network transmission of the pump machine unit optimized operation regulation system, providing communication interface for the monitoring layer and the data layer, and providing control information flow for the operation process twin of the digital twin.

The data blending layer is used for the aggregation and fusion, optimization calculation, machine learning, data twin, analysis and mining and storage management of the pump machine unit optimized operation regulation system data, providing data information flow for the control performance twin of the digital twin.

The interactive control layer can access all data sources and processes, provide users with man-machine information interaction services, as well as real-time monitoring, reliable operation and interactive control of the pump machine unit optimized operation regulation system, and provide decision control flow for the digital twin.

An optimal operation mechanism of the pump machine unit optimized regulation system in virtual space realized by the digital twin includes the following steps:

step 1: demand conditions input, which specifically comprises: users input demand conditions into the system through the information portal (also referred as information gateway module).

step 2: optimization schemes calculation, which specifically includes: user demand conditions are transmitted to the optimization module (also referred as optimization algorithm module) and machine learning module for scheme calculation and multiple optimization schemes are given.

step 3: scheme evaluation, which specifically includes: multiple optimization schemes are entered into the evaluation module for scheme evaluation, and several better schemes are screened out (also referred as selected).

step 4: simulation calculation, which specifically includes: several better schemes into the digital twin body for simulation calculation and output the simulation results.

step 5: performance evaluation, which specifically includes: the evaluation module evaluates the performance of the simulation results.

step 6: scheme decision, which specifically includes: after the performance evaluation, the optimal scheme enters the decision-making machine module (also referred as decision module) for decision, judge whether meet the requirements, if meet the requirements, the optimal scheme output to the pump machine unit control center, if not meet the requirements, adjust the parameters, re-calculate the new scheme until meet the requirements of the decision machine.

step 7: pump machine unit control, which specifically includes: the control center will adjust the relevant variables according to the final scheme, so that it can meet the demand conditions under a certain reliability, so that the system can save the most energy, so as to realize the optimization and adjustment.

Pump machine unit optimization adjustment is described according to the computing scheme based on the machine learning and the optimization algorithm, through the optimization algorithm and machine learning, provides new solutions of adjustment of the working condition, evaluates multiple schemes and performs simulation calculation to multiple evaluated schemes entered into the digital twin, and makes decisions on the simulation results and then delivers them to the pump machine unit control center. The pump machine unit control center adjusts relevant variables according to the optimized scheme to meet the demand conditions under a certain reliability and thereby make the system be most energy efficient, thus realizing the optimization adjustment.

The establishment of the data model of the digital twin includes an establishment of the physical object twin, an establishment of the operation process twin, an establishment of the control performance twin and an establishment of simulation model, specifically included the following steps:

step 1: establishment of three-dimensional, which specifically includes: establishing the 3D physical model the same as a physical entity of a physical space, that is, the pump machine unit and its pipe fitting accessories form a structure same as the physical entity, defining geometric properties, movement properties, functional properties, material properties, a geometric shape and a mechanical structure of physical entity, etc., so as to realize the physical object twin.

step 2: establishment of the logical model, which specifically includes: mapping the 3D physical model to the logical model, graphically and formally describing the components, organizational structure and operation mechanism of the logical model, feedbacking the attributes and behaviors of each element to the physical model through the logical model, and realizing the optimization of the physical model.

step 3: process model is established, which specifically includes: according to step 1 and step 2, the actual running process of the fluid is mapped to the digital space, and the same numerical simulation process with the actual running process is established, so as to realize the operation process twinning.

step 4: establishment of the control model, which specifically includes: establishing the same control process mapping with the physical entity, which can make the digital twin body be capable of imitating its phase control process, to realize the adjustment of related parameters, so as to realize the control performance twin.

step 5: establishment of the simulation model, based on step 1, step 2, step 3 and step 4, building the simulation model with the same structure, function and process as the entity to realize the visualization of the twin object, the twin structure, the twin process and the twin control of the physical entity.

step 6: simulation model optimization, which specifically includes: according to the simulation model in step 5 and based on multi-source data of the database, machine learning is used to train and optimize the simulation model, and simulation results are fed back to each model and each model is optimized.

step 7: verification of the simulation model, which specifically includes: verify the consistency and reliability of the physical model and the simulation model. If the optimization conditions of the simulation model are met, go to step 6; otherwise, go back to step 2.

step 8: data model construction, which specifically includes: building the computable data model, based on multi-source data of database, using machine learning, iterative optimization and intelligent decision method, to realize data mirror and data exchange of the physical body and the virtual twin body.

step 9: realization of digital twin, which specifically includes: integrating 3D physical model, logical model, process model, control model, simulation model and data model, and realizing digital twin of pump machine unit optimized regulation system of physical space in virtual space through data-driven and real-time interaction.

The digital twin has the functions of perception analysis, analogue simulation, iterative optimization and decision control, and realizes the intelligent perception, real-time monitoring, optimization adjustment and health prediction of the physical entity of the pump machine unit through the digital twin body.

The 3D physical modeling tools for realizing the digital twin include a laser scanner, a UG NX, a Creo Parametric, and a 3DsMax, and CFD software is used in virtual simulation.

According to FIG. 1, based on the information physical mapping relationship between the pump machine unit system in physical space and the pump machine unit system in virtual space, the theoretical architecture of the above digital twin drive is established, including the physical space, the virtual space and the digital twin. Physical space elements include the physical entity of the pump machine unit, the running state of the pump machine unit and the control process of the pump machine unit. Virtual space elements include physical model of pump machine unit, virtual state of pump machine unit and virtual control of pump machine unit to realize digital simulation model similar to physical space. The digital twin includes the physical object twin, the operation process twin and the control performance twin. Digital twin model realizes information interaction and digital mapping between physical space and virtual space of running pump machine unit through data-driven dynamic optimization simulation model. Secondly, data fusion and machine learning algorithm are used to analyze the data, health prediction and intelligent control of the running pump machine unit through model training, iterative optimization and intelligent analysis. Optimization algorithm and machine learning are used to optimize the condition regulation.

Figure 2:
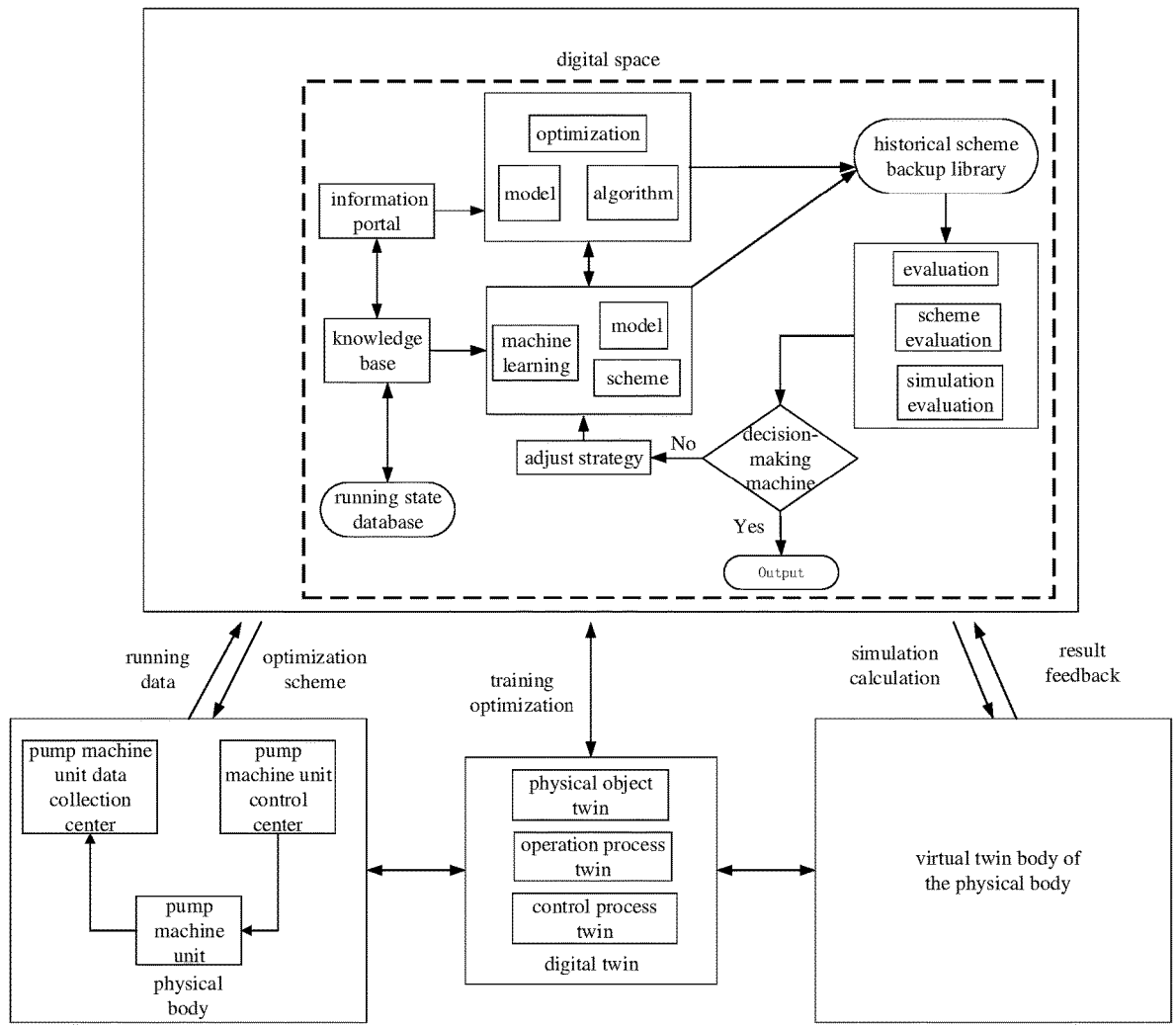
FIG. 2 is a detailed schematic structural view of the pump machine unit optimized operation regulation system based on digital twin of the disclosure.

According to FIG. 2, based on the information physical mapping relationship between the physical space pump machine unit and the virtual space pump machine unit, the detailed structure of the above pump machine unit optimized operation regulation system based on digital twin is constructed, including the physical body, the virtual twin body of the physical body, digital twin and digital space that drives the whole digital twin. The physical body includes the pump machine unit, the pump machine unit data collection center and the pump machine unit control center. The digital twin includes the physical object twin, the operation process twin and the control performance twin. The digital space includes the information portal (also referred as information gateway module), a knowledge base (also referred as knowledge-base module), operation state database, optimization module (also referred as optimization algorithm module), machine learning module, history scheme backup library, evaluation module, decision machine (also referred as decision module) and so on. The physical object twin, the operation process twin and the control performance twin of the physical body are realized through the digital space and the digital twin, so as to realize the mapping from the physical body to the virtual twin body. The information portal provide human-computer interaction platform, not only can access all database and module, and can realize consistent with the physical space in visual effect on the geometric structure of virtual scene, can realize consistent with physical model motion process of virtual scene, can be controlled with physical model consistent with the virtual scene, to achieve the 1:1 mirror physical space and virtual space. The optimization module provides optimization scheme for the adjustment of new working conditions; in addition to providing optimization schemes for the adjustment of new working conditions, the machine learning module's main functions also include model learning and continuous optimization of the model to make the whole system more accurate. The evaluation module can evaluate and screen the scheme and evaluate the performance of simulation results. The decision module makes decisions based on the evaluated performance, if the conditions are met, the optimal scheme will be output; or if the conditions are not met, the strategy will be adjusted for optimization again.

Figure 3:
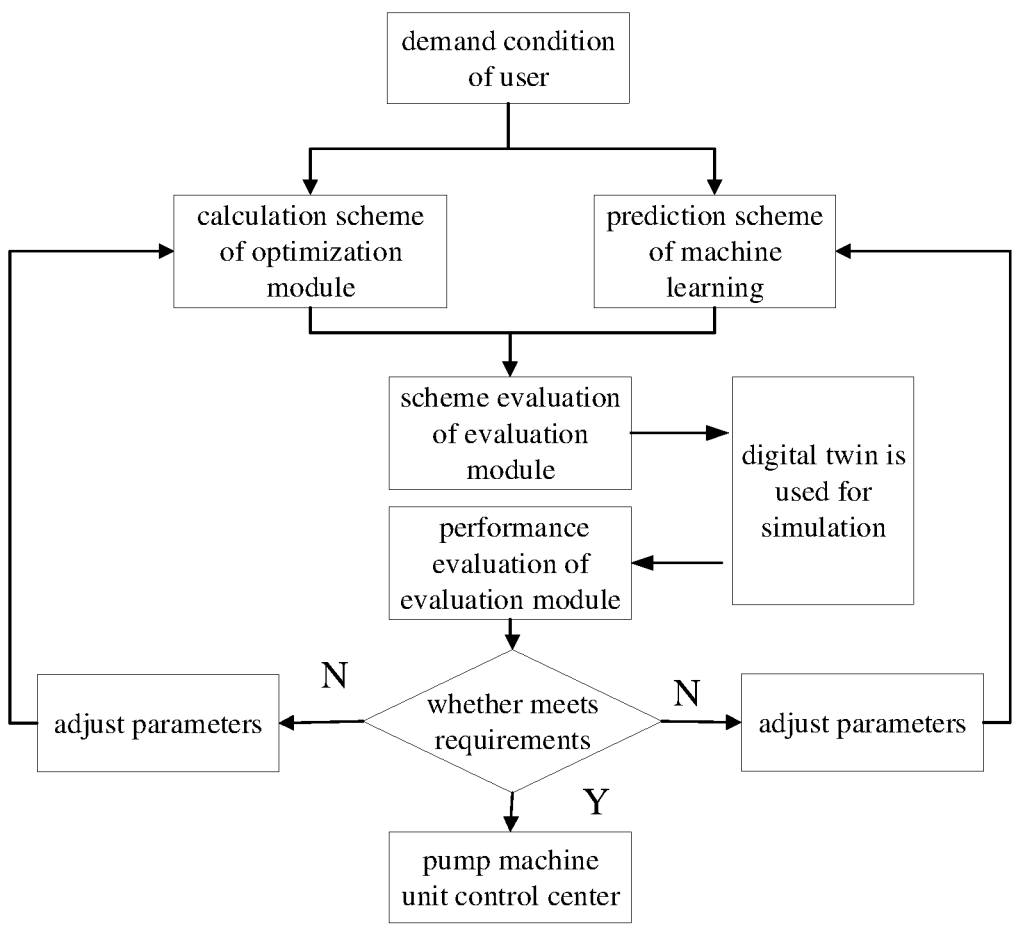
FIG. 3 is the optimal operation mechanism schematic view of the pump machine unit optimized operation regulation system based on digital twin of the disclosure.

According to FIG. 3, based on the information physical mapping relationship between the pump machine unit in physical space and the pump machine unit in virtual space, the optimal operation mechanism diagram of the pump machine unit optimal operation regulation system based on digital twin is constructed. Firstly, the demand conditions are input into the system through the information portal, and the user demand conditions are input into the optimization module and machine learning module for scheme calculation and multiple optimization schemes are given, which enter the evaluation module for scheme evaluation and screen out several better schemes. Secondly, several better schemes enter the digital twin body for simulation calculation and output the results. Then the evaluation module evaluates the performance of the simulation results. Finally, enter the decision-making machine module to make decisions and judge whether the requirements are met. If the requirements are met, the optimal scheme is output to the control center of the pump machine unit, the control center will adjust the relevant variables according to the scheme to make the system run under the new working conditions the most energy saving; or if the requirements are not met, the parameters are adjusted and the new scheme is calculated again until the requirements of the decision machine are met.

Figure 4:
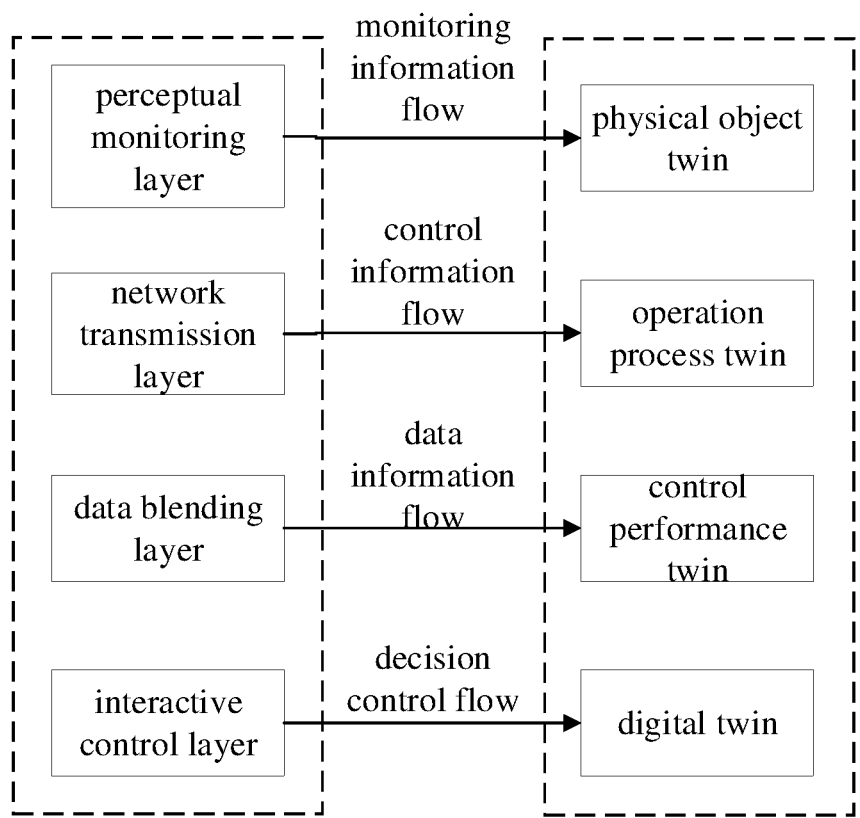
FIG. 4 is the data model schematic view of the pump machine unit optimized operation regulation system based on digital twin of the disclosure.

According to FIG. 4, the data model of the above method is a four-layer architecture, including the perception monitoring layer, the network transmission layer, the data blending layer and the interactive control layer. Among them, the perception monitoring layer is used to monitor the pump machine unit in the running process of equipment working state, working condition state parameters, equipment running parameters, to provide monitoring information flow for the physical object twin of the digital twin; The network transmission layer is disposed above the perception monitoring layer of the data model, which is used for the unified networking, protocol conversion and network transmission of the pump machine unit optimized operation regulation system. It provides communication interface for the perception monitoring layer and data blending layer, and provides control information flow for the operation process twin of the digital twin. The data blending layer is disposed above the network transmission layer of the data model, which is used for the aggregation and fusion, optimization calculation, machine learning, data twin, analysis and mining, and storage management of the data of the optimized operation regulation system of the pump machine unit, and provides data information flow for the control performance twin of the digital twin. The interactive control layer is disposed on the top of the data model, can access all data sources and processes to provide users with human-machine information interaction services, real-time monitoring, reliable operation and interactive control of the pump machine unite optimized operation regulation system, and provide decision control flow for the digital twin.

Figure 5:
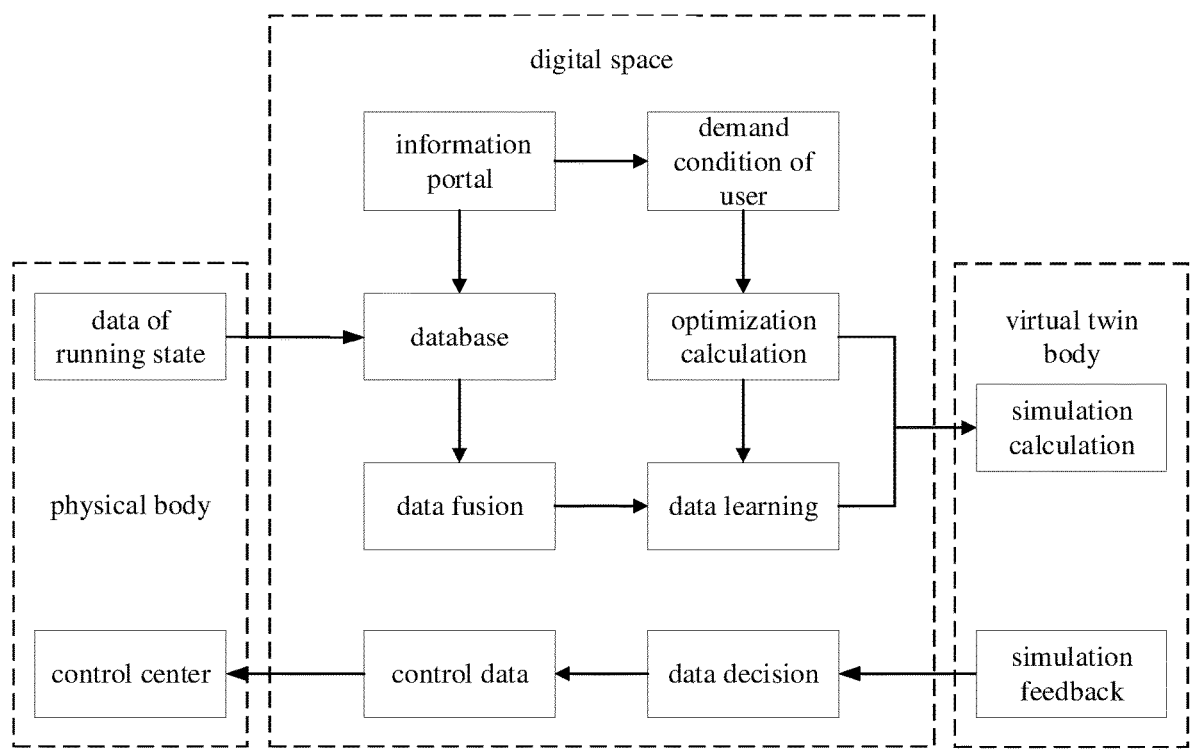
FIG. 5 is the optimization data flow chart of the pump machine unit optimized operation regulation system based on digital twin of the disclosure.

According to FIG. 5, the optimization data flow of the pump machine unit optimized operation regulation system based on digital twin includes: (1) storing the operating status data of the pump machine unit in the database, fusing the data into data with certain characteristics and regularity through the knowledge model, and then learning the data through the machine learning module; (2) the information portal can access all data sources and provide human-computer interaction interface. When the user enters the demand condition, optimization algorithm and machine learning start to calculate the scheme. The calculated scheme data flow is evaluated and then enters the digital twin for simulation calculation; (3) the results of the simulation calculation are evaluated and fed back to the decision-making machine. After the data decision, the data control is finally obtained and transmitted to the pump machine unit control center to control the pump machine unit for the adjustment of relevant parameters, so as to realize the optimized operation and adjustment of the pump machine unit.

Figure 6:
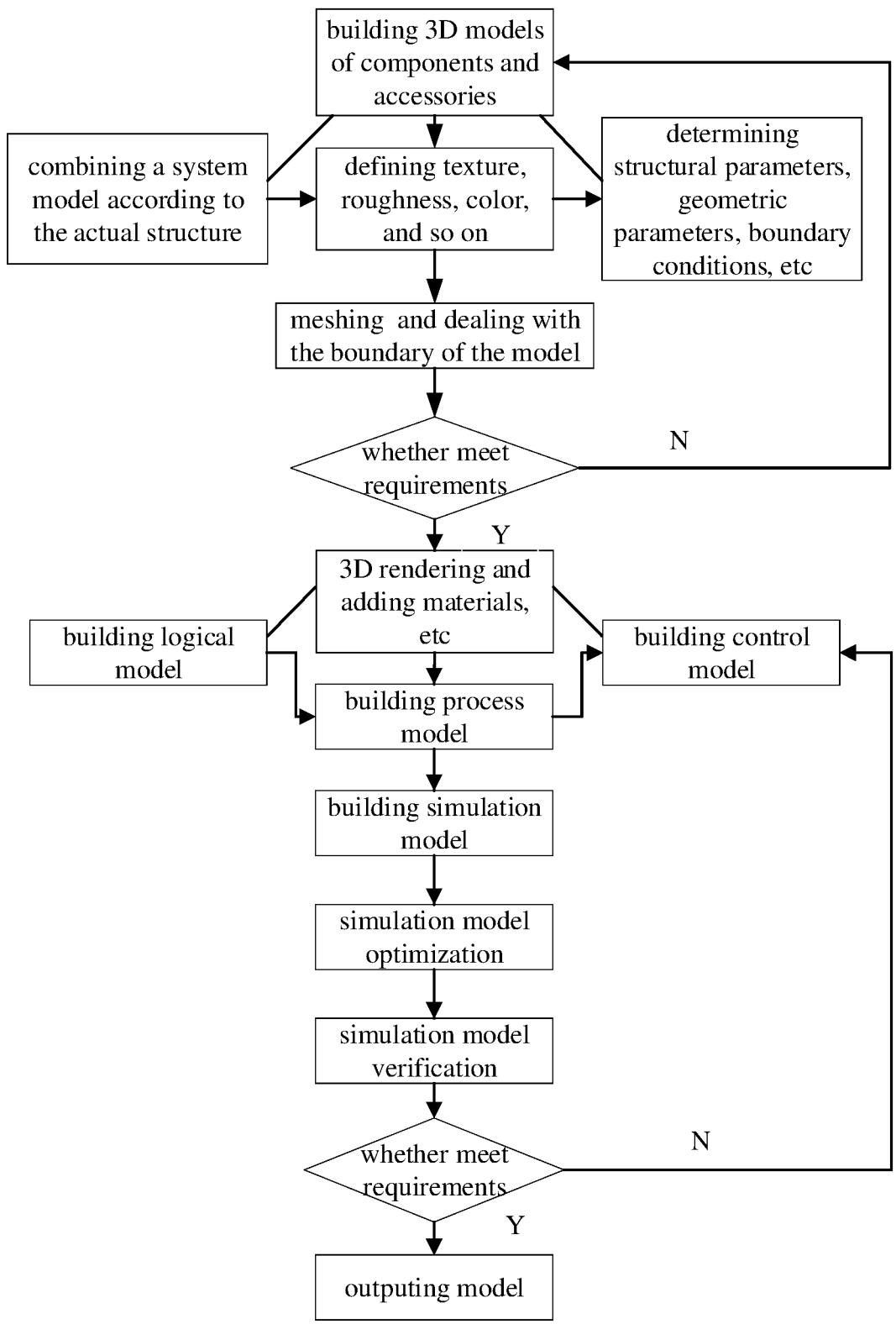
FIG. 6 is the flow chart of the simulation model construction of the pump machine unit optimized operation regulation system based on digital twin of the disclosure.

According to FIG. 6, the simulation model construction process of the pump machine unit optimized operation regulation system based on digital twin includes: (1) constructing three-dimensional models of each component and accessory, that is, the pump machine unit and its accessory frame constitute the same structure as the entity; (2) combining them into system model according to the actual structure; (3) defining the texture, roughness, color and other attributes of accessories of each component; (4) determining the structural parameters, geometric parameters, boundary conditions, etc.; (5) conducting mesh division and boundary processing for the model, and checking whether the requirements are met, if so, the next step will be carried out; otherwise, adjusting parameters and re-execute flow (1); (6) 3D rendering and adding materials to the model; (7) building the logical model, the process model and the control model; (8) building a simulation model with the same structure, function and process as the entity; (9) based on multi-source data of database, the simulation model is trained and optimized by machine learning, and the simulation results are fed back to each model and optimized for each model; (10) verifying the consistency and reliability of the physical model and the simulation model. If the optimization conditions of the simulation model are met, the model will be output; otherwise, adjust parameters and re-execute flow (7) until the requirements are met, and finally the model will be output.

The pump machine unit optimized operation regulation system and method based on digital twin are based on machine learning algorithm, and describe the evolution process and realization method of digital twin body by constructing the 3D physical model, the logical model, the process model, the control model, the simulation model and the data model. When user demand conditions changes, the system and method are used to provide new solutions of adjustment of new working condition through optimization algorithm and machine learning, to evaluate multiple schemes and then enter into the digital twin body for simulation calculation, and make decision the result of the simulation and then delivery to the pump machine unit control center. The pump machine unit control center according to the optimized scheme to adjust relevant variables, to make it meet demand condition under a certain reliability, making the system most energy-efficient, so as to achieve optimization and adjustment, to solve the existing pump station or pump machine unit in the process of operation of low efficiency, low reliability problem, solving the pump machine unit in the process of operation monitoring, health diagnosis of equipment can be achieved, so as to improve the pump machine unit in the process of health status.

The above shows and describes the basic principles, main features and advantages of the disclosure. Industry technical personnel should be aware of the disclosure and involved in the above embodiment is based on the pump machine unit optimized operation regulation system and method based on digital twin, in addition to the digital twin is applied to optimized operation of the pump machine unit as a digital control system, through the improved can also be applied to other pump, pump stations contains pump system such as application fields. These changes and improvements are falling into a demanding protection within the scope of the present disclosure. The scope of protection required by the disclosure is defined by the attached claims and their equivalents.

What is claimed is:

1. A pump machine unit optimized operation regulation system based on digital twin comprising: a physical body, a virtual twin body, a digital twin and a digital space;
   wherein the physical body comprises a pump machine unit, a pump machine unit data collection center and a pump machine unit control center; the digital space is structured by mutual coupling and evolution of an information gateway module, a data repository module, a knowledge-base module, an optimization algorithm module, a machine learning module, an evaluation module and a decision module, and thereby to drive the digital twin to realize data mirroring, information interactive feedback, optimization adjustment, equipment health diagnosis and analogue simulation of a pump machine unit optimized regulation system in virtual space and another pump machine unit optimized regulation system in physical space; and the digital twin comprises a physical object twin, an operation process twin and a control performance twin; and wherein the digital twin and the analogue simulation are realized according to a digital twin model, the digital twin model is a four-layer architecture comprising:
  a perception monitoring layer, configured to monitor equipment working state, working condition state parameters, and equipment operation parameters of the pump machine unit in an operation process, and thereby to provide a monitoring information flow for the physical object twin of the digital twin;
  a network transmission layer, disposed above the perception monitoring layer, and configured for unified networking, protocol conversion and network transmission of the pump machine unit optimized operation regulation system, and providing communication interfaces for the perception monitoring layer and a data blending layer, and providing a control information flow for the operation process twin of the digital twin;
  the data blending layer, disposed above the network transmission layer, and configured to perform aggregation and fusion, optimization calculation, machine learning, data twin, analysis and mining, and storage management of data of the pump machine unit optimized operation regulation system, and provide a data information flow for the control performance twin of the digital twin; and
  an interactive control layer, disposed at a top of the digital twin model, and configured to access the data of the pump machine unit optimized operation regulation system, perform real-time monitoring, reliable operation and interactive control of the pump machine unite optimized operation regulation system, and provide a decision control flow for the digital twin;
wherein an optimized operation mechanism of the pump machine unit optimized regulation system in virtual space realized by the digital twin comprises the following steps:
demand conditions input, comprising: inputting demand conditions into the system through the information gateway module by a user;
optimization schemes calculation, comprising: transmitting the demand conditions to the optimization algorithm module and the machine learning module for performing scheme calculation based on the demand conditions to obtain multiple optimization schemes;
scheme evaluation, comprising: performing scheme evaluation to the optimization schemes entered into the evaluation module to select several better schemes;
simulation calculation, comprising: performing simulation calculation to the several better schemes entered into a digital twin body and outputting simulation results;
performance evaluation, comprising: performing performance evaluation to the simulation results by the evaluation module;
scheme decision, comprising:
  doing a decision to an optimal scheme entered into the decision module after the performance evaluation to judge whether it meets requirements,
  outputting the optimal scheme to the pump machine unit control center when it meets the requirements, or adjusting parameters when it does not meet the requirements and re-calculating a new scheme until it meets the requirements of the decision module;

pump machine unit control, comprising: adjusting relevant variables according to a final scheme by the pump machine unit control center to meet the demand conditions under a certain reliability and thereby make the system be most energy efficient, thus achieving optimized regulation.

2. The pump machine unit optimized operation regulation system based on digital twin according to claim 1, wherein the pump machine unit, the pump machine unit data collection center and the pump machine unit control center as a whole to constitute a corresponding physical entity of the pump machine unit optimized operation regulation system based on digital twin; the pump machine unit comprises water pumps, a flow meter, an electric valve, a check valve, a bypass pipeline, a pressure gauge and a connecting pipeline; the pump machine unit data collection center is configured to perform a collection of data of flow in each the pipeline, a collection of data of start-stop state of each the pump, a collection of data of water pressure in each the pipeline, a collection of data of opening degree of the electric valve, a collection of data of speed of each the pump, a collection of data of power of each the pump and a collection of other required data; and the pump machine unit control center is configured to perform a control of speed of each the pump, a control of opening degree of the electric valve and a control of start-stop of each the pump.

3. The pump machine unit optimized operation regulation system based on digital twin according to claim 1, wherein the information gateway module is configured to provide a human-computer interaction platform,
  the data repository module is configured to store operating data monitored by the pump machine unit and data and scheme information required in the digital space,
  the knowledge-base module is configured to provide a knowledge model,
  the optimization algorithm module is configured to optimize demand conditions and provide a regulation scheme,
  the machine learning module is configured to learn historical decision schemes, train and optimize a simulation model, learn and correct a model of optimization algorithm, and learn monitored data,
  the evaluation module is configured to perform optimization scheme selection and evaluate simulation results, and
  the decision module is configured to make decisions on evaluated schemes.

4. The pump machine unit optimized operation regulation system based on digital twin according to claim 1, wherein a pump machine unit optimized regulation is achieved according to a computing scheme based on machine learning and optimization algorithm, provides the optimization schemes to regulation of the demand conditions through the optimization algorithm and the machine learning, evaluates the optimization schemes and perform simulation calculation to the optimization schemes after the evaluation entered into the digital twin body, makes decision to the simulation results and then delivers the final scheme to the pump machine unit control center; and the pump machine unit control center adjusts the relevant variables according to the final scheme to meet the demand conditions under the certain reliability and thereby make the system be most energy efficient, thus achieving the optimized regulation.

5. The pump machine unit optimized operation regulation system based on digital twin according to claim 1, an establishment of the data model of the digital twin comprises an establishment of the physical object twin, an establishment of the operation process twin, an establishment of the control performance twin and an establishment of a simulation model, specifically comprises the following steps:

step 1: establishment of three-dimensional (3D) physical model, comprising: establishing a 3D physical model the same as a physical entity of the physical space, which specifically comprises making the pump machine unit and its pipe fitting accessories form a structure same as the physical entity, defining geometric properties, movement properties, functional properties, material properties, a geometric shape and a mechanical structure of the physical entity, and thereby realizing the physical object twin;

step 2: establishment of logical model, comprising: mapping the 3D physical model to a logical model, describing components, organizational structure and operation mechanism of the logical model graphically and formally, feedbacking properties and behaviors of the components to the physical model through the logical model, and thereby realizing an optimization of the physical model;

step 3: establishment of process model, comprising: mapping an actual running process of a fluid to the digital space according to step 1 and step 2, and establishing a numerical simulation process same with the actual running process, and thereby realizing the operation process twin;

step 4: establishment of control model, comprising: establishing a mapping of a control process same with the physical entity to make the digital twin body be capable of imitating a same control process and thereby realize adjustment of related parameters, and thereby realizing the control performance twin;

step 5: establishment of simulation model, comprising: building a simulation model with the same structure, function and process as the physical entity to realize visualizations of a twin object, a twin structure, a twin process and a twin control of the physical entity based on step 1, step 2, step 3 and step 4;

step 6: simulation model optimization, comprising: training and optimizing the simulation model by machine learning based on multi-source data of database according to the simulation model in step 5, and feedbacking simulation results to each model and optimizing each model;

step 7: verification of simulation model, comprising:
verifying consistency and reliability of the physical model and the simulation model,
executing step 6 if the optimization conditions of the simulation model are met, otherwise, returning to execute step 2;

step 8: construction of data model, comprising: building a computable data model, using methods of machine learning, iterative optimization and intelligent decision to realize data mirroring and data exchanging of the physical body and the virtual twin body based on multi-source data of database;

step 9: realization of digital twin, comprising: integrating the 3D physical model, the logical model, the process model, the control model, the simulation model and the data model, and realizing the digital twin of the pump machine unit optimized regulation system in physical space in the virtual space through data-driven and real-time interaction.

6. The pump machine unit optimized operation regulation system based on digital twin according to claim 5, wherein the digital twin has functions of perception analysis, analogue simulation, iterative optimization and decision control, the digital twin achieves intelligent sensing, real-time monitoring, optimized regulation and health prediction of the physical entity of the pump machine unit through the digital twin body.

7. The pump machine unit optimized operation regulation system based on digital twin according to claim 5, wherein 3D physical modeling tools for realizing the digital twin body comprise a laser scanner, a Unigraphics Next Generation (UG NX), a Creo Parametric and a 3D Studio Max (3DsMax), and computational fluid dynamics (CFD) series software is used in virtual simulation calculation.

8. A pump machine unit optimized operation regulation system based on digital twin comprising: a physical body, a virtual twin body, a digital twin and a digital space;
wherein the physical body comprises a pump machine unit, a pump machine unit data collection center and a pump machine unit control center;
wherein the digital twin comprises a physical object twin, an operation process twin and a control performance twin;
wherein a data model of the digital twin is a four-layer architecture comprising:
a perception monitoring layer, configured to monitor equipment working state, working condition state parameters, and equipment operation parameters of the pump machine unit in an operation process, and thereby to provide a monitoring information flow for the physical object twin of the digital twin;
a network transmission layer, disposed above the perception monitoring layer, and configured for unified networking, protocol conversion and network transmission of the pump machine unit optimized operation regulation system, and providing communication interfaces for the perception monitoring layer and a data blending layer, and providing a control information flow for the operation process twin of the digital twin,
the data blending layer, disposed above the network transmission layer, and configured to perform aggregation and fusion, optimization calculation, machine learning, data twin, analysis and mining, and storage management of data of the pump machine unit optimized operation regulation system, and provide a data information flow for the control performance twin of the digital twin, and
an interactive control layer, disposed at a top of the data model, and configured to access the data of the pump machine unit optimized operation regulation system, perform real-time monitoring, reliable operation and interactive control of the pump machine unite optimized operation regulation system, and provide a decision control flow for the digital twin;
wherein the digital space comprises:
an optimization algorithm module, configured to perform scheme calculation based on demand conditions to obtain first optimization schemes;
a machine learning module, configured to perform scheme prediction based on the demand conditions to obtain second optimization schemes;
an evaluation module, configured to perform scheme evaluation on the first optimization schemes and the second optimization schemes to select better schemes, output the better schemes to the virtual twin body for simulation calculation of the better schemes, and perform performance evaluation on simulation results corresponding to the simulation calculation of the better schemes respectively to obtain performance evaluation results corresponding to the better schemes respectively; and
a decision module, configured to judge whether the respective performance evaluation results meet requirements, and when one of the performance evaluation results meets the requirements, output the better scheme corresponding to the one of performance evaluation results as an optimal scheme to the pump machine unit control center.

* * * * *